Figure 1:
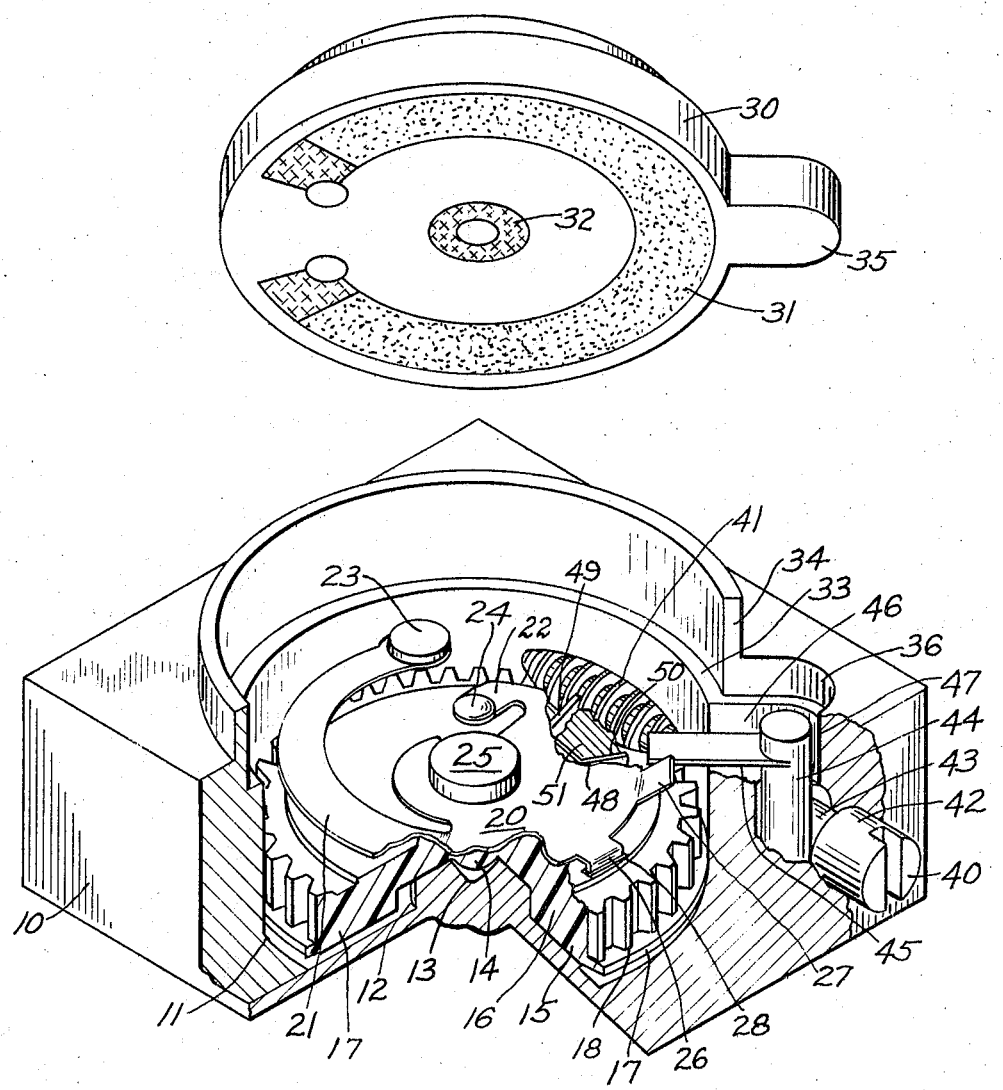

March 22, 1966  A. A. GRUNWALD ETAL  3,242,452
CLUTCH MEANS FOR MULTIPLE TURN VARIABLE RESISTOR
Filed July 25, 1962  2 Sheets-Sheet 1

FIG. I.

INVENTORS
ARTHUR A. GRUNWALD
ROBERT K. RICHARDSON
BY *Jennings B. Thompson*
ATTORNEY

United States Patent Office 3,242,452
Patented Mar. 22, 1966

1

3,242,452
CLUTCH MEANS FOR MULTIPLE TURN VARIABLE RESISTOR
Arthur A. Grunwald, Edwardsburg, Mich., and Robert K. Richardson, Elkhart, Ind., assignors to CTS Corporation, Elkhart, Ind., a corporation of Indiana
Filed July 25, 1962, Ser. No. 212,216
7 Claims. (Cl. 338—174)

This invention relates in general to variable resistors and particularly to variable resistors which are operated by the rotation of a threaded shaft.

Specifically this invention is concerned with a clutch arrangement to be used with variable resistors which employ a threaded shaft which must be rotated many times in order to move the contact of the control from one end of the resistive element to the other. Usually one turn of the threaded shaft or leadscrew rotates the contact only a short distance which means that it is very difficult for the operator to know when he is reaching the end of the resistive path. Stop means are usually provided in the control to stop the movement of the contact when it reaches the end of the resistive path but since the controls are quite small and the leadscrew is usually being rotated by a screwdriver there is a good likelihood that some damage will be done to the stop means in the control when the contact reaches the end of its travel before the operator realizes that the stop has been engaged.

For this reason clutch means of various types are employed in these controls to "disengage" the leadscrew when the contact reaches the end of its travel so that the stop and other elements of the control will not be damaged by an excessive amount of rotation of the leadscrew in either direction.

It is the principal object of this invention to provide a clutch arrangement for a multiturn type of variable resistor which protects the control against damage in the event of excessive rotation of the leadscrew in either direction.

An additional important feature of the clutch arrangement of this invention is that it produces an audible signal when operating which tells the operator that he has engaged the stop and that the contact has reached the end of its travel in that direction.

This added feature of the audible signal is of great advantage in that it will keep the operator from turning the leadscrew an excessive number of turns after reaching the stop and thereby shortening the life of the clutch means used in the control.

It is therefore an additional object of this invention to provide a novel clutch arrangement which not only operates to protect the control from damage due to excess rotation of the leadscrew but which also produces an audible signal when the clutch is in operation.

It is a further object of this invention to provide clutch means which will reengage the gear teeth on the contact carrier with the leadscrew when the direction of rotation of the leadscrew is reversed.

Further objects and advantages of the present invention will become apparent as the following description proceeds, and the features of novelty which characterize the invention will be pointed out with particularity in the claims annexed to and forming a part of this specification.

The clutch of this invention is designed for use with leadscrew operated variable resistors which have a contact mounted on a rotating member so that the contact travels along an arcuate resistive element. This type control is commonly referred to as a "square" trimmer. The contact carrying rotating member is equipped with gear teeth which engages a leadscrew which when rotated imparts rotation to the contact carrying member through

2 the gear teeth. Stop means are provided to limit the rotation of the contact in both directions. In accordance with the invention a portion of the gear teeth are replaced by a U-shaped spring member which is located on the gear so that when the contact reaches the end of its travel in one direction, one leg of the spring will be in engagement with the threads on the leadscrew and when the contact has reached the end of its travel in the other direction the other leg will be in engagement with the threads on the leadscrew.

The groove in which the spring is located in the gear is arranged so that the legs of the spring can flex in one direction but not the other. In this way when the contact has reached the end of its travel further rotation of the leadscrew will simply flex the leg of the spring outwardly and let it snap over the crest of the thread into engagement with the following thread. In other words, the leg will simply ratchet over the thread as the leadscrew is rotated. When the direction of the rotation of the leadscrew is reversed the leg will engage the stop means which prevents it from flexing in the other direction and thus it will be carried along with the thread on the leadscrew bringing the gear teeth on the gear back into engagement with the thread on the leadscrew.

The snapping of this leg of the U-shaped spring over the crest of the screwthread on the leadscrew produces an audible clicking sound which can clearly be heard by the operator thus indicating to him that the contact has reached the end of its travel.

Figure 2:
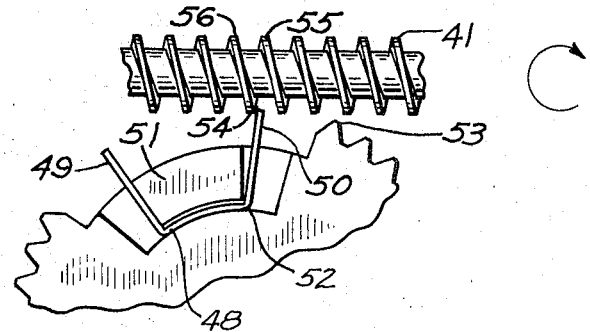
Figure 3:
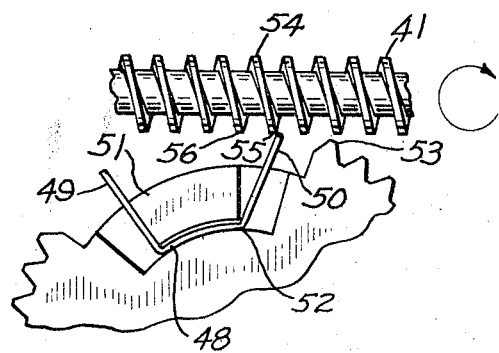
Figure 4:
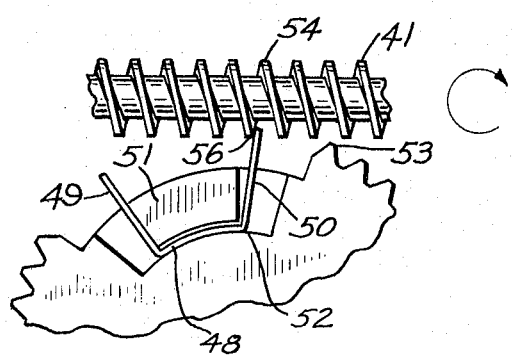

The invention will now be described in detail making reference to the accompanying drawings in which:

FIGURE 1 is an exploded isometric view partly in section of the control showing the U-shaped clutch spring in engagement with the leadscrew; and FIGURES 2, 3, and 4 illustrate the relationship of the leadscrew and the U-shaped spring member as the leadscrew is rotated after the contact has reached the end of its travel in one direction.

The housing 10 of the control consists of a square body which is provided with a cylindrically shaped cavity 11. Rotatably mounted in the cavity is a toothed gear 16. Providing a bearing for the gear is the boss 12 which has a conically shaped cavity 13 therein to receive the spherical boss 14 on the bottom of the gear 16. The gear is also provided with a flange 17 which engages the bottom of the cavity 11 and stabilizes the gear as it rotates on the bearing 12. The gear is equipped over most of its periphery with gear teeth 18. One section of the periphery has no gear teeth but is equipped with a U-shaped spring 48.

Mounted on the gear is the contact 20. It has spring arms 21 and 22 which support contact buttons 23 and 24 in such a way that they will engage the resistive element 31 and the conductive path 32 which are mounted on the base 30. These spring arms 21 and 22 are deflected downward when the control is assembled so that they will maintain the contacts 23 and 24 firmly against the conductive and resistive paths. The contact is oriented on the gear by means of the boss 25 which fits in a hole provided therefor in the contact and by means of the tab 26 on the contact which is bent downward and inserted in the slot 28 in the gear. The boss 25 serves to centrally locate the contact whereas the tab 26 and the slot 28 combine to carry the contact along with the gear as it is rotated by the leadscrew.

As said above the base 30 supports the resistive path 31 and the conductive path 32. The base is supported above the contact by the shoulder 33 provided within the cavity 11. The flange 34 serves to hold the base in the proper lateral position above the contactor. To keep the base from rotating it is equipped with an arm 35 which fits into a correspondingly shaped slot 36.

Extending laterally through the housing 10 is the opening 42 in which is mounted the leadscrew 40. The leadscrew is equipped with a groove 43 adjacent one end which engages a pin 44 of non-conductive material. The pin is inserted through the opening 47 which passes through the housing 10 transverse to the direction of the opening 42. The pin and groove combine to hold the leadscrew in position in the housing. The pin 44 is also equipped with a stop arm 45 which extends into the cavity 11 through a groove 46 and acts as part of the stop mechanism for the control. This stop arm 45 is arranged to engage the tab 27 on the contact and stop the rotation of the gear in either direction when the contact button 23 has reached the end of its travel along the resistive element 31.

The leadscrew is equipped with a screwthread 41 which is arranged to engage the gear teeth 18 on the gear so that rotation of the leadscrew will cause rotation of the gear.

As stated above one section on the periphery of the gear has no gear teeth but instead is provided with a U-shaped groove 52 in which a U-shaped spring 48 is located. The spring 48 is equipped with legs 49 and 50 which extend radially outward from the gear and which alternately engage the teeth on the leadscrew when the gear approaches the end of its travel in either direction. In other words, these legs 49 and 50 are arranged to act as gear teeth would act if the periphery of the gear were completely equipped with teeth up until the time the gear reaches the end of its travel in either direction.

The spring 48 is located on the gear so that either the leg 49 or the leg 50 will engage the leadscrew just prior to the time that the tab 27 on the contact engages the stop arm 45. In FIGURE 1 for example, the tab 27 has just engaged the stop arm 45 to prevent further counterclockwise rotation of the gear. In this position the leg 49 is the only interconnecting member between the gear and the leadscrew. When the gear is rotated in a clockwise direction until the tab 27 engages the opposite side of the stop arm 45, the leg 50 will be the only interengaging member between the gear and the leadscrew. This is the condition shown in FIGURES 2, 3, and 4.

FIGURE 2 shows the position of the various members of the clutch when the gear has reached the end of its travel in a clockwise direction. The leg 50 is in engagement with the thread on the leadscrew and the nearest gear tooth 53 has just moved out of engagement with the leadscrew. The resiliency of the leg 50 is such that it will carry the gear around against the stop arm 45 even after the gear tooth 53 has moved out of engagement with the leadscrew. The force necessary to do this will cause some movement of the leg which is indicated in FIGURE 2 where it is shown to be forced away from the member 51 which is located between the legs 49 and 50 of the spring and which is an integral part of the gear. After the stop arm 45 has been engaged and no more rotation of the gear is possible, continued rotation of the leadscrew will cause the condition illustrated in FIGURE 3. In FIGURE 2 the leg 50 is in engagement with the thread at the point 54. As the leadscrew is rotated, this point 54 will move 180° to the position indicated in FIGURE 3 and the point 55 will move into engagement with the leg 50. This will then bend the leg 50 outwardly a distance equal to one-half the pitch of the thread. Continued rotation of the leadscrew will either cause further deflection of the leg 50 or will cause the leg to snap over the crest of the thread. If the leg moves over the crest of the thread at the point 55 it will snap into engagement with the thread at the point 56 which is the position indicated in FIGURE 4. The pitch of the thread, the thread depth, and the length of the leg 50 all determine when the leg will snap over.

This snapping over action will continue as long as the leadscrew is rotated in the direction indicated. The operator of course will hear the snapping of the leg 50 as it moves from one thread to the other and he will know that he has reached the end of rotation in that direction. He will then reverse the direction of rotation of the leadscrew. This will force the leg 50 against the member 51 which will rotate the gear in a counterclockwise direction until the gear tooth 53 moves back into engagement with the leadscrew.

This identical action occurs when the gear approaches the end of its travel in the other direction and the leg 49 of the spring 48 engages the leadscrew.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

The invention claimed is:

1. A variable resistor comprising: a housing; a base of nonconductive material supported by the housing; a resistive path and a conductive path supported by the base; a leadscrew rotatably mounted in the housing and equipped with a screwthread; a bridging contact electrically connecting the resistive path to the conductive path; and contact driving means for causing the contact to move along the resistive path comprising: a contact supporting member rotatably mounted in the housing and provided with teeth and with a toothless section on its periphery, a U-shaped slot provided in one side of the toothless section, the legs of the slot being wider than the base of the slot, said teeth being arranged to engage the screwthread on the leadscrew so that rotation of the leadscrew will rotate the contact supporting member; resilient means disposed in said U-shaped slot of the toothless section, said resilient means comprising a U-shaped spring having two legs and a bight section with the legs extending outwardly from the member and in position to engage the thread on the leadscrew as the member is rotated; stop means arranged to limit the rotation of the member in either direction when one of the legs of the U-shaped spring engages the thread of the leadscrew; and the portion intermediate the legs of the U-shaped slot forming a stop member for limiting flexure of the legs of the spring toward each other from the unflexed position.

2. A variable resistor comprising a housing, a resistance element disposed in the housing, a gear provided with a plurality of spaced teeth rotatably mounted in the housing, a contact connected to the gear for wiping the resistance element, a leadscrew having a thread cooperating with the spaced teeth for rotating the gear and moving the contact intermediate the ends of the resistance element, said gear being provided with a toothless section, a U-shaped slot provided in one side of the toothless section, the legs of the slot being wider than the base of the slot, a U-shaped spring disposed in the U-shaped slot with the legs of the spring extending radially outwardly beyond the ends of the legs of the slot for engagement with the thread of the leadscrew, and a first stop means for limiting rotation of the gear in either direction, a side of each of said legs of the slot forming a second stop means for limiting flexure in one direction of the leg of the spring associated therewith whereby upon rotating the leadscrew in one direction one leg of the spring engages the thread of the leadscrew when the gear reaches the end of its travel in said one direction thereby limiting further travel of the gear in one direction and upon rotation of the leadscrew in the other direction the one leg of the spring contacts the second stop means and remains substantially unflexed thereby moving with rotation of the leadscrew and rotating the gear in the other direction and when the gear reaches the end of its travel in the other direction the other leg of the U-shaped spring engages the thread of the leadscrew in like manner.

3. In a variable resistor, the combination of a housing, a resistance element disposed in the housing, a contact engaging the resistance element, means for wiping the contact intermediate the ends of the element including a gear provided with a plurality of spaced teeth and having a toothless section, a U-shaped slot provided in one side of the toothless section, the legs of the slot being wider than the base of the slot, a pair of spaced resilient legs disposed in the legs of the slots and extending outwardly beyond the ends of the legs of the slot in the same direction as the teeth, first stop means for limiting the rotation of the contact, a side of each of said legs of the slot forming a second stop means for limiting flexure of the resilient legs toward each other, and a leadscrew having a thread cooperating with the spaced teeth for moving the gear and the resilient legs whereby upon moving the gear in one direction to a predetermined position one of the resilient legs engages the thread of the leadscrew and flexes away from the other resilient leg thereby preventing further movement of the gear in the one direction and upon moving the gear in the opposite direction the one resilient leg engages the second stop means and remains substantially unflexed thereby moving with rotation of the leadscrew and rotating the gear in the opposite direction and upon further moving of the gear in the opposite direction to a predetermined position the other resilient leg engages the thread of the leadscrew and flexes away from the one resilient leg thereby preventing further movement of the gear in the opposite direction.

4. In a variable resistor provided with a housing having a resistance element, a contact engaging the resistance element, a gear provided with a plurality of spaced teeth and connected to the contact, a leadscrew having a thread engaging the teeth of the gear for driving the gear and for moving the contact intermediate the ends of the resistance element, and an electrically nonconductive pin locking the leadscrew in the housing, the improvement comprising a stop arm fixedly secured to the pin, a tab carried by the contact and adapted to engage the stop arm to limit the extent of travel of the gear in either direction, the gear being provided with a toothless section, and a pair of resilient legs disposed in the toothless section and extending outwardly in the same direction as the teeth, one leg being adapted to engage the leadscrew when the gear reaches the end of its travel in one direction and the other leg being adapted to engage the leadscrew when the gear reaches the end of its travel in the other direction.

5. The variable resistor of claim 4 wherein the resilient legs are part of a U-shaped member and a stop means is carried by the gear for preventing flexing of the legs toward each other.

6. In a variable resistor, the combination of a housing provided with a cavity, a resistance element disposed in the cavity of the housing, a contact engaging the resistance element, means carried by the contact for wiping the contact intermediate the ends of the element including a gear rotatably mounted in the housing and provided with a plurality of spaced teeth, a leadscrew rotatably mounted in the housing and having a thread engaging the teeth of the gear, a pin locking the leadscrew in the housing, stop means carried by the gear, and a stop arm fixedly secured to the pin and adapted to engage the last-mentioned means for limiting rotation of the gear in either direction.

7. In a variable resistor provided with a housing having a resistance element, a contact for wiping engagement with the resistance element, a rotatable gear connected to the contact, the gear having a plurality of spaced teeth, a lead screw having a thread engaging the teeth of the gear for driving the gear and wiping the contact intermediate the ends of the resistance element, and a pin locking the leadscrew in the housing, the improvement comprising a stop arm fixedly secured to the pin, and stop means carried by the gear and adapted to engage the stop arm when the gear is rotated a predetermined distance in one direction.

References Cited by the Examiner

UNITED STATES PATENTS

| | | | |
|---|---|---|---|
| 2,880,293 | 3/1959 | Blanco | 338—164 |
| 3,059,200 | 10/1962 | Bamford | 338—174 |
| 3,115,614 | 12/1963 | Habereder | 338—174 |

FOREIGN PATENTS 907,481   3/1954   Germany.

RICHARD M. WOOD, *Primary Examiner.*

ANTHONY BARTIS, *Examiner.*